No. 875,449. PATENTED DEC. 31, 1907.
A. McGONAGLE.
HEATING SYSTEM.
APPLICATION FILED MAR. 21, 1907.
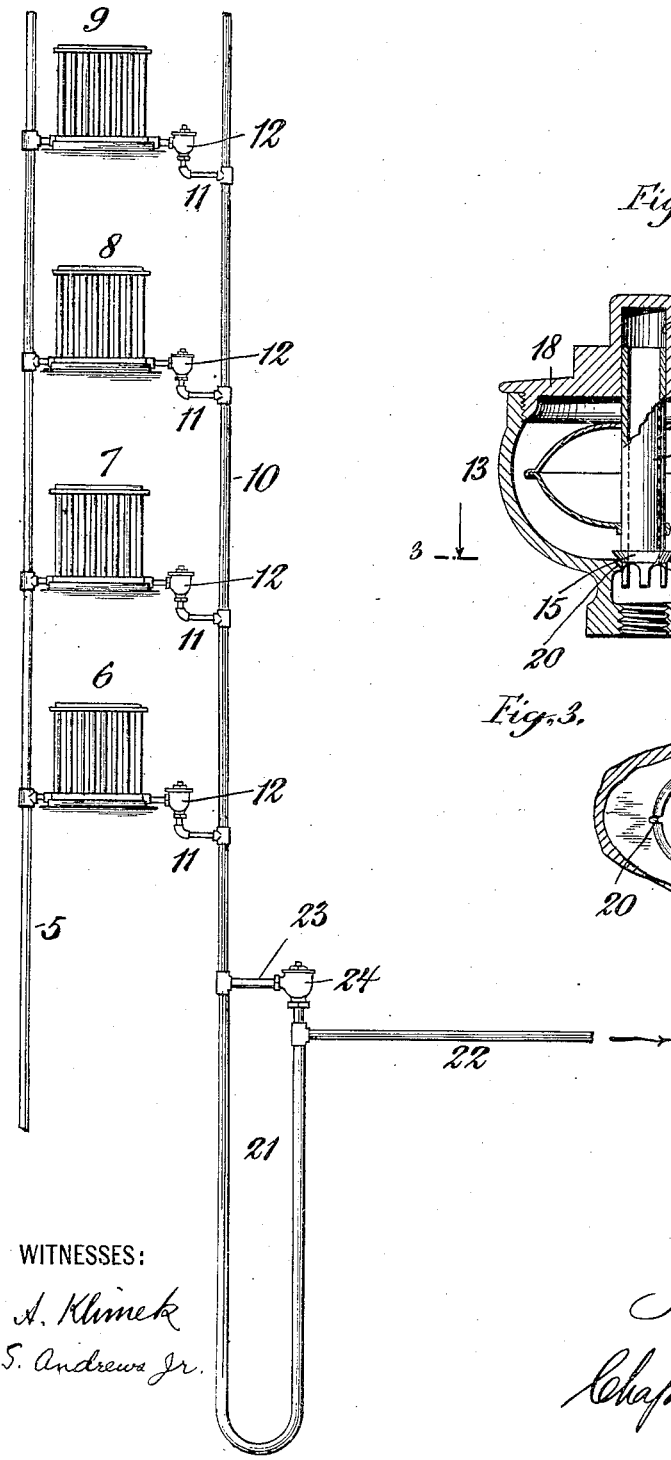
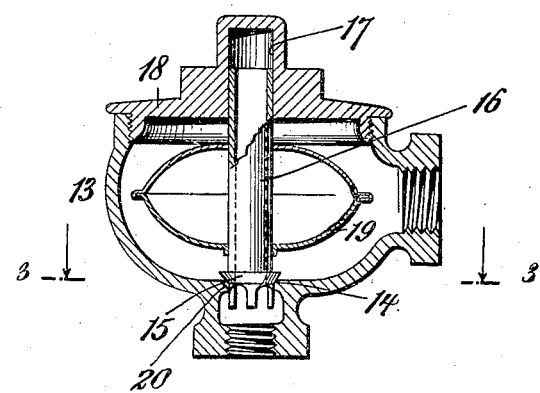
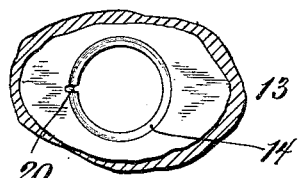
WITNESSES:
INVENTOR
BY
ATTORNEYS

UNITED STATES PATENT OFFICE.

ARTHUR McGONAGLE, OF EAST ORANGE, NEW JERSEY.

HEATING SYSTEM.

No. 875,449.    Specification of Letters Patent.    Patented Dec. 31, 1907.

Application filed March 21, 1907. Serial No. 363,538.

*To all whom it may concern:*

Be it known that I, ARTHUR McGONAGLE, a citizen of the United States of America, and a resident of East Orange, county of Essex, State of New Jersey, have invented certain new and useful Improvements in Heating Systems, of which the following is a specification, reference being had to the accompanying drawings, forming a part thereof.

My invention relates to improvements in steam heating systems, and particularly to means for carrying off the water of condensation therein.

My invention consists in the employment of a normally open trap for carrying away the waters of condensation which flow from the system under normal conditions, together with float controlled means for carrying away water in excess of the capacity of the trap normally employed. The float controlled means is arranged in parallel with the first mentioned trap, and air is normally carried away through this by-pass without necessary operation of the valve means therein.

Specifically, I employ the aforesaid means in connection with a pipe which leads from a number of radiators in a heating system, and I conveniently employ in addition thereto an individual trap for each said radiator, such trap arranged to permit the passage of water and air from the radiators, but substantially opposing passage of steam therefrom.

The main trap above referred to is intended to have a capacity sufficient for carrying away all the water that may be delivered from one or more radiators at a time, up to a predetermined number, while the auxiliary trap, together with the main trap, will carry away the water of condensation from all the said radiators, that is from the entire system.

In order that my invention may be fully understood, I will now proceed to describe an embodiment thereof, having reference to the accompanying drawings illustrating same, and will then point out the novel features in claims.

In the drawings, Figure 1 illustrates in somewhat diagrammatic form a steam heating system employing a plurality of radiators with individual traps therefor, and in connection therewith is also shown a main and an auxiliary trap of the character above described. Fig. 2 is a view in central vertical section through the auxiliary trap. Fig. 3 is a detail sectional view of the same, taken upon the plane of the line 3—3 of Fig. 2.

The steam heating system illustrated comprises an inlet riser 5, a plurality of radiators 6, 7, 8 and 9 connected in parallel therewith, a return pipe 10 with which the said radiators are connected in parallel through branches 11, and float-controlled valves 12 arranged in the said branches 11. The float-controlled valves 12 may be conveniently of the form shown in Figs. 2 and 3 of the drawings, such form of valve being specifically described and claimed in United States Patent No. 823,805, granted to me June 19th, 1906. Briefly, such valve comprises a casing 13 having a valve seat 14, a valve 15 fitted to the said seat, a hollow valve stem 16 secured to the said valve, said valve stem being substantially of the diameter of the passage containing the valve seat 14 and fitted to slide in a chamber 17 in the upper head 18 of the valve, whereby the said valve will be entirely balanced as to fluid pressure, and a float 19 secured to the said stem 16.

The valve seat 14 has a small file cut 20 therein, or a minute passage is otherwise formed for permitting the escape of air when the valve is closed. This passage is so small as to substantially oppose the flow of steam therethrough but will freely permit the flow of air. If water accumulates in the casing, it will lift the float 19 and hence also the valve 15 carried thereby, thereby permitting free discharge of the said water past the valve and valve seat, as will be well understood. Directly the water has been discharged the valve will again close to oppose the passage of steam.

The lower end of the discharge pipe 10 connects with a main trap, here shown in the form of a U-shaped pipe 21. The discharge end of this U-shaped pipe is connected with a discharge pipe 22. In a so-called vacuum system this pipe 22 will connect with exhausting apparatus such as suction pump or the like. As water flows down the return pipe 10 it will collect in the trap 21, and will be carried off through the discharge pipe 22. The level of the water in the two legs of the trap will of course depend upon the difference in pressure upon opposite sides thereof. Under normal conditions the level in the receiving end will be much lower than the level of the discharge end, the latter said level being the level of the point of connection thereof with the discharge pipe 22. It will happen sometimes, however, that the capacity of the trap 21 will not be sufficient to carry off the water discharged from the system. Such emergency sometimes occurs after a number of radiators have been closed for a time and then are all opened simultaneously. To provide for such a contingency I have arranged a by-pass 23 and a float-controlled trap 24 therein. This float-controlled trap 24 may conveniently be the same form of valve which is illustrated in Fig. 2 herein. If the water then rises in the intake leg of the trap 21 to a point above the level of the by-pass 23, the float-controlled valve 24 will be operated and the surplus water will be discharged through said by-pass to the discharge pipe 22 until the level of water shall again drop below the level of said by-pass 23. The by-pass 23 is necessarily employed in a device of this character for the purpose of carrying off the air discharged through the traps 12. Such by-pass is arranged at or above the level of the pipe 22 and contains a restricted orifice therein of a size sufficient only to permit the passage of air therethrough. This restricted orifice may, in the present instance, conveniently be the orifice 20 in the valve seat 14 (see Fig. 3) so that the auxiliary trap 24 and by-pass 23 may be employed normally for discharging the air, and, upon emergency, for discharging excess of water. This arrangement enables me to employ a preferred form of trap for normally carrying off the water of condensation, such preferred form being a valveless water-seal trap of the type illustrated by the loop shown in the drawings. The employment of auxiliary means in parallel therewith enables me, however, to use a main trap of smaller capacity than would be otherwise necessary, and prevents the possibility of the return line 10 becoming choked with water, as might happen if such auxiliary means were not provided.

What I claim is:

1. In a steam heating system, the combination with a plurality of radiators, a return pipe connected therewith in parallel, a steam trap between each of said radiators and said pipe, a water seal trap connected with said return pipe, a by-pass connected with discharge above said main trap, said by-pass having a restricted constantly open orifice for permitting the discharge of air therethrough, and a float controlled valve arranged in said by-pass for discharging water therethrough in excess of the water discharged by said main trap.

2. In a steam heating system, the combination with a plurality of radiators and a return pipe therefor, of a water seal trap connected with the return pipe, a by-pass arranged above the level of the trap and provided with a constantly open minute orifice for the discharge of air therethrough, a float-controlled valve arranged in said by-pass for discharging excess water, and individual float-controlled balanced valves for the individual radiators, said valves also provided with means for permitting discharge of air therethrough, but for opposing the passage of steam.

ARTHUR McGONAGLE.

Witnesses:
C. F. CARRINGTON,
L. S. ANDREWS, Jr.